United States Patent
Guimbard et al.

(10) Patent No.: US 8,083,476 B2
(45) Date of Patent: Dec. 27, 2011

(54) METHOD OF DESIGNING A MULTISTAGE TURBINE FOR A TURBOMACHINE

(75) Inventors: Jean-Michel Bernard Guimbard, Cely En Biere (FR); Olivier Kueny, Montgeron (FR); Eric Schwartz, Seine Port (FR)

(73) Assignee: SNECMA, Paris (FR)

( * ) Notice: Subject to any disclaimer, the term of this patent is extended or adjusted under 35 U.S.C. 154(b) by 590 days.

(21) Appl. No.: 12/329,142

(22) Filed: Dec. 5, 2008

(65) Prior Publication Data

US 2009/0155062 A1 Jun. 18, 2009

(30) Foreign Application Priority Data

Dec. 14, 2007 (FR) ...................... 07 08710

(51) Int. Cl.
*F04D 29/44* (2006.01)
*F04D 29/54* (2006.01)
(52) U.S. Cl. ..................... 415/199.5; 415/194
(58) Field of Classification Search ............... 415/199.5, 415/194, 194.5, 191
See application file for complete search history.

(56) References Cited

U.S. PATENT DOCUMENTS

| 7,059,831 B2 * | 6/2006 | Suciu et al. ................. 415/199.5 |
| 2008/0148564 A1 * | 6/2008 | Burton et al. .............. 29/888.02 |

FOREIGN PATENT DOCUMENTS

| EP | 1 182 339 A2 | 2/2002 |
| EP | 1 201 880 A2 | 5/2002 |
| EP | 1 247 938 A2 | 10/2002 |
| EP | 1 724 440 A1 | 11/2006 |
| WO | WO 95/29331 | 11/1995 |

\* cited by examiner

*Primary Examiner* — Chuong A Luu
*Assistant Examiner* — Nga Doan
(74) *Attorney, Agent, or Firm* — Oblon, Spivak, McClelland, Maier & Neustadt, L.L.P.

(57) ABSTRACT

A method of designing a multistage turbine for a turbomachine in which each turbine stage comprises a stator row and a rotor row each made up of an annular row of airfoils, wherein, for all of the stator or rotor rows, it consists in simultaneously modifying the shapes of the airfoils of said rows to straighten out the wakes from the trailing edges of said airfoils, then in angularly positioning the rows in such a manner that the wakes from the airfoils of the stator (or rotor) airfoils impact against the leading edges of the stator (or rotor, respectively) airfoils of the rows situated downstream, in order to achieve multistage aerodynamic coupling simultaneously over the turbine as a whole.

11 Claims, 3 Drawing Sheets

METHOD OF DESIGNING A MULTISTAGE TURBINE FOR A TURBOMACHINE

FIELD OF THE INVENTION

The present invention relates to a method of designing a multistage turbine for a turbomachine such as an airplane turboprop or turbojet.

BACKGROUND OF THE INVENTION

A turbomachine turbine comprises a plurality of stages, each made up of a stationary stator grid or row and a moving rotor grid or row. Each row is made up of an annular row of airfoils that are regularly distributed around the longitudinal axis of the turbine. The airfoils of a rotor row are carried by a disk connected to the shaft of the turbine, and the airfoils of a stator row are connected to an outer casing of the turbine.

The airfoils of the rows extend substantially across the entire radial extent of the flow section in which hot gas flows through the turbine. The hot gas leaves the combustion chamber of the turbomachine and flows through the turbine, thereby delivering energy to the rotor rows that drive the turbine shaft in rotation.

In order to improve the performance of the turbine, it is known to implement multistage aerodynamic coupling between two consecutive rotor rows separated from each other by a stator row, or between two consecutive stator rows separated from each other by a rotor row.

Multistage aerodynamic coupling consists in selecting two consecutive rows of the same type (i.e. two rotor rows or two stator rows) and having the same number of airfoils or having a number of airfoils that is a multiple of the number of airfoils of the same type situated upstream, and in angularly positioning the downstream row relative to the upstream row in such a manner that the wakes formed from the trailing edges of the airfoils of the upstream row impact within a certain tolerance on the leading edges of the airfoils of the downstream row.

Methods have already been proposed for designing a turbine so as to achieve such coupling. Nevertheless, those methods make use of complex calculations that are very expensive in terms of time, thereby making them incompatible with conventional design deadlines. Furthermore, those methods do not always take account of multistage aerodynamic coupling over the full height of the turbine flow section, i.e. over the entire radial extent of the airfoils of the rows. Finally, presently available methods are applied only on a pair of rows of the same type, i.e. on one-and-a-half stages of the turbine (stator row/rotor row/stator row or rotor row/stator row/rotor row), and they therefore need to be repeated several times over in order to design all of the stages of the turbine. This approach presents a major drawback: the pairs of rows are positioned angularly independently of other pairs of rows, whereas each row ought to depend on the angular position of the row situated upstream and ought to influence the angular position of the row situated downstream, while taking account of the full height of the turbine flow section. Unless recourse is had to a lengthy iterative process that is expensive in terms of computation time, the drawback leads to a turbine configuration that is not optimized for multistage aerodynamic coupling.

OBJECT AND SUMMARY OF THE INVENTION

A particular object of the invention is to provide a solution to these problems that is simple, effective, and inexpensive.

The invention provides a design method that enables multistage aerodynamic coupling to be achieved simultaneously over all of the rotor rows or all of the stator rows of the turbine, and enabling this to be done over substantially the full height of the turbine flow section.

To this end, the invention provides a method of designing a multistage turbine for a turbomachine, each stage of the turbine comprising a stator row and a rotor row, each formed by an annular row of airfoils, each stator (or rotor, respectively) row having the same number of airfoils or a number that is a multiple of the number of airfoils of a row of the same type situated upstream, wherein the method consists, for all of the stator or rotor rows:

a) in modifying simultaneously the shape of the airfoils of the various rows to straighten out the wakes from the trailing edges of said airfoils over substantially the entire radial extent of the airfoils; and then b) in angularly positioning the rows relative to one another in such a manner that the wakes from the stator (or rotor, respectively) rows of a stage n impact within a certain angular tolerance on the leading edges of the stator (or rotor, respectively) rows of a downstream stage n+1, so as to achieve multistage aerodynamic coupling simultaneously over the turbine as a whole.

The invention applies equally well to rotor rows and to stator rows in a turbine, in order to achieve multistage aerodynamic coupling simultaneously over all of the rows of a given type in the turbine, and over substantially the full height of the turbine flow section, i.e. over the entire radial extent of the airfoils. The term "row" is thus used in the present application to designate either a rotor row or a stator row.

The method of the invention consists initially in modifying or optimizing simultaneously the shapes of the rotor or stator airfoils of the various stages so as to straighten out the wakes from the trailing edges of the airfoils over the entire radial extent of the airfoils.

The term "straighten out the wakes" is used herein to mean causing the profiles of the wakes to become substantially straight, where these profiles are formed by the intersections between the streamlines of the profiles and a plane perpendicular to the axis of rotation of the turbine substantially in register with the leading edges of the airfoils of a row. The wake from the trailing edge of an airfoil generally has a profile that is deformed or undulating, such that even if it is as well aligned as possible with the leading edge of an airfoil of the same type in the following stage, it does not enable multistage aerodynamic coupling to be optimized. The invention enables this drawback to be remedied by straightening out the wakes of the airfoils prior to performing the angular adjustments or settings for the various rows of the same type under consideration in the turbine.

The method then consists in angularly positioning the rows relative to one another in such a manner that the wakes from the stator (or rotor, respectively) airfoils of a stage n impact with a certain amount of tolerance against the leading edges of the stator (or rotor, respectively) airfoils of a downstream stage n+1.

The turbine has a finite number of stages. The rotor or stator row of the second stage of the turbine is angularly position relative to the row of the same type in the first stage situated upstream therefrom, with this step being made easier by the straightening of the wakes performed in the preceding step. The angular position of the second row relative to the first row is determined so that the wakes from the airfoils of the first row impact against the leading edges of the airfoils of the same type of the second row within a certain angular tolerance that generally corresponds to a percentage of the pitch between two adjacent airfoils in the row. The row of the same type in the third stage situated downstream from the second stage is angularly positioned in turn in the same manner as that described above, and so on to the last downstream stage of the turbine.

In step a), the method may consist:

1) in defining the shapes of the airfoils of the various rows over substantially the entire radial extent of the airfoils;

2) in determining the mean flow of gas around the airfoils of the various rows over substantially the entire radial extent of the airfoils, e.g. by axially symmetrical flow calculation over the entire turbine;

3) in determining how the wakes from the airfoils of the various rows vary; and 4) in verifying that the wakes from the stator (or rotor, respectively) airfoils of a stage $\underline{n}$ are substantially parallel, within a given angular tolerance, to the leading edges of the stator (or rotor, respectively) airfoils of a respective downstream n+1.

The shapes of the airfoils may be modified by varying one or more parameters selected, by way of example, from: the spatial distribution of the airfoils; the curvature of the airfoils; the angular positions of the leading and trailing edges of the airfoils; etc. The shape of the airfoils of one row may be identical to or different from the shape of the airfoils of other stages.

The mean flow of gas between the airfoils can be determined by at least one axially symmetrical flow calculation over the entire turbine, and over the full radial extent of the airfoils, said calculation being based for example on the principle of radial equilibrium or on Euler's theorem.

Thereafter, the variations in the wakes from the airfoils in the various rows are analyzed using an appropriate software tool, and it is verified that the wakes extend substantially radially and parallel to the leading edges of the airfoils of the row situated downstream.

In the event of the verification not being satisfactory, the method of the invention may further consist:

5) in modifying the shapes of the airfoils of the various rows over the entire radial extent of the airfoils;

6) in verifying the aerodynamic behavior of the modified airfoils, e.g. by two- or three-dimensional steady flow calculations for each row; and 7) in repeating steps 2), 3), and 4).

While modifying the shapes of the airfoils in a row, the method preferably consists in conserving the mean load distribution of said row so that the modifications do not have any direct influence on the performance of the turbine.

The steady flow calculations that can be used in step 6) may be based for example on the two-dimensional (2D) or three-dimensional (3D) Navier-Stokes equations, and they make it possible to verify the behavior of each airfoil over one or more streamlines.

Above-mentioned steps 5), 6), and 7) can be repeated one or more times until the wakes from the airfoils in each row have been straightened out sufficiently and are substantially in alignment with the leading edges of the airfoils of the row of the same type situated directly downstream.

In order to limit the number of repetitions of the loop constituted by steps 5), 6), and 7), it is possible to use an optimization algorithm that, as a function of the results of step 4), deduces the most appropriate shape changes to be applied to the rows in step 5), on the basis of databases.

The method of the invention may also consist, after step 4) or 7), in verifying the aerodynamic behavior of the turbine by analyzing the behavior of gas in the turbine, e.g. by a three-dimensional steady flow calculation.

This step serves to validate the shape changes made to the airfoils by evaluating the overall aerodynamic behavior of the turbine, but without taking account of the effect of multistage aerodynamic coupling since that has not yet been optimized. This step can be performed by means of at least one steady flow calculation based on the 3D Navier-Stokes equations.

In step b), the method may consist:

i) in identifying, e.g. by using at least one unsteady flow calculation, the optimum angular position for the stator (or rotor, respectively) row of each stage n+1 relative to the stator (or rotor, respectively) row of the upstream stage n and relative to the wakes of the airfoils of the row of said stage $\underline{n}$; and ii) in angularly positioning the rows relative to one another from upstream to downstream in such a manner that the wakes formed by the airfoils of the stator (or rotor, respectively) row of a stage n impact within a certain angular tolerance against the leading edges of the stator (or rotor, respectively) airfoils of a downstream stage n+1.

The invention also provides a method of fabricating a multistage turbine for a turbomachine, wherein the method consists in designing a turbine by the above-described method and then in making said turbine with the rows as defined by said design method.

The invention also provides a turbomachine, such as an airplane turboprop or turbojet, including a turbine designed and fabricated as specified above.

BRIEF DESCRIPTION OF THE DRAWINGS

The invention can be better understood and other characteristics, details, and advantages thereof appear more clearly on reading the following description made by way of non-limiting example and with reference to the accompanying drawings, in which.

MORE DETAILED DESCRIPTION

Figure 1:
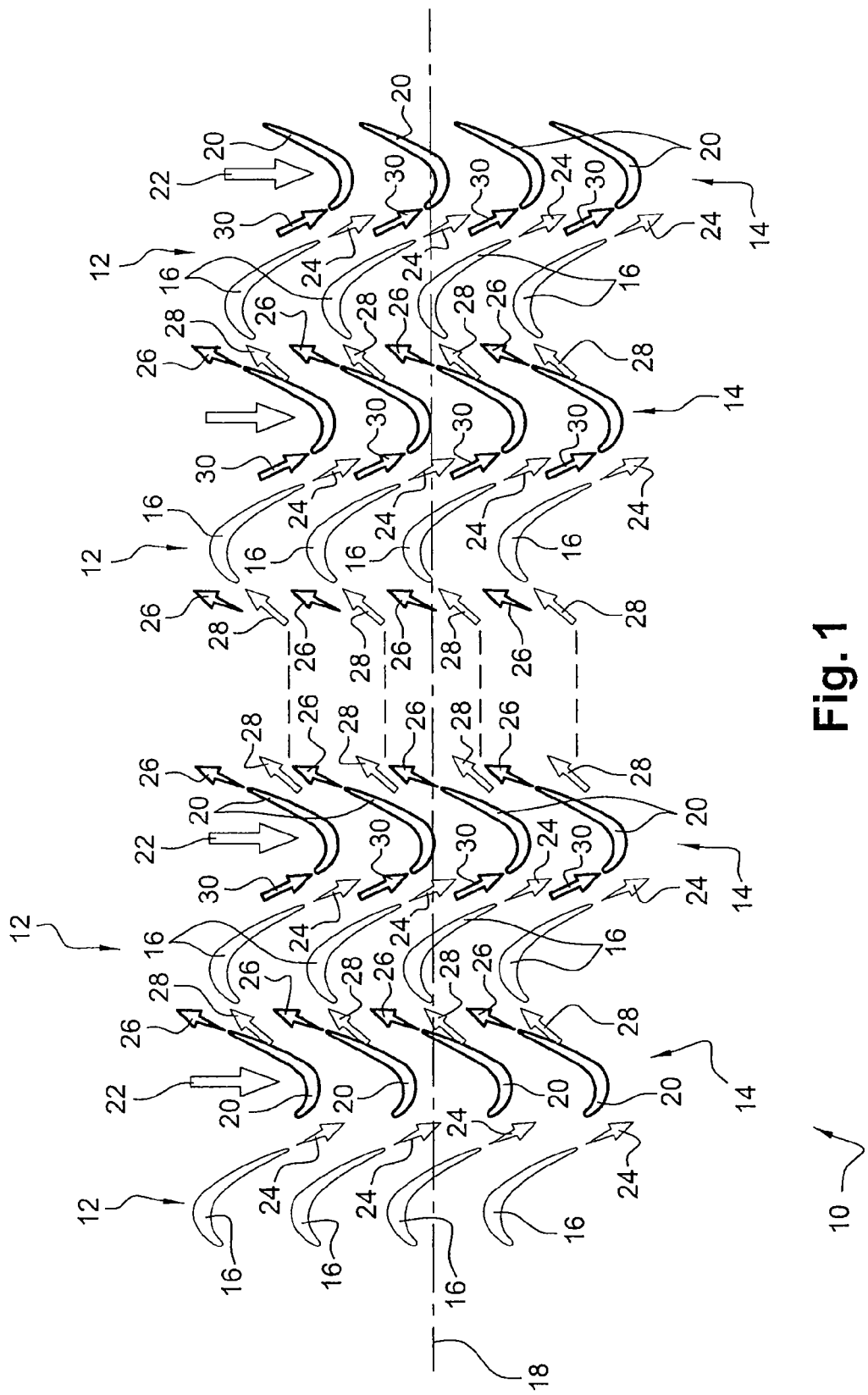
FIG. 1 is a fragmentary and highly diagrammatic view of a multistage turbine of a turbomachine, seen from above.

Reference is made initially to FIG. 1 which shows in highly diagrammatic manner a portion of a multistage turbine 10 of a turbomachine such as an airplane turboprop or turbojet, the turbine 10 having a finite number k of stages, each comprising a stator row or grid 12 and a rotor row or grid 14 situated downstream from the stator row 12.

Each stator row 12 comprises a plurality of vanes 16 that are regularly distributed around the longitudinal axis 18 of the turbine and that are carried by an outer casing of the turbine (not shown). Each rotor row 14 comprises a plurality of blades 20 that are carried by a disk (not shown) and that are likewise regularly distributed around the axis 18 of the turbine.

The stator and rotor rows 12 and 14 have the same number of airfoils 16 and 20. In a variant, the number of airfoils 16, 20 in one row 12, 14 may be a multiple of the number of airfoils in a row of the same type situated upstream therefrom. Rows of a given type may therefore each have a number px of airfoils, where x is a given number of airfoils and p is a positive integer equal to 1, 2, 3, or even more. In the example shown, the rotor and stator rows 14 and 12 are each shown with four airfoils, for reasons of clarity.

The rotor rows 14 are driven to rotate in the same direction (represented diagrammatically by arrows 22) about the axis 18. The stator rows are stationary and their vanes serve to redirect the flow of gas through the turbine. In known manner, each airfoil 16, 20 comprises a leading edge and a trailing edge relative to the gas flowing in the flow section of the turbine.

In the prior art, it is known to position the rotor rows 14 angularly relative to one another in such a manner that the wakes from the blades 20 of an upstream rotor row impact with a certain angular tolerance against the leading edges of the blades 20 of the rotor row situated directly downstream, i.e. separated from the upstream rotor row by a single stator row. This multistage aerodynamic coupling serves in particular to improve the performance of the turbine and of the turbomachine in general. Such coupling can also be performed on the stator rows 12 in the same manner as for the rotor rows 14.

In the example of FIG. 1, arrows 24 and 26 represent respectively the wakes from the trailing edges of the vanes 16 of the stator row 12 and from the trailing edges of the blades 20 of the rotor row 14 of a stage n, and arrows 28 and 30 represent respectively the same wakes after passing through the row of the other type located downstream therefrom and reaching the leading edges of the vanes 16 of the stator or the leading edges of the blades 20 of the rotor in stage n+1.

Figure 2:
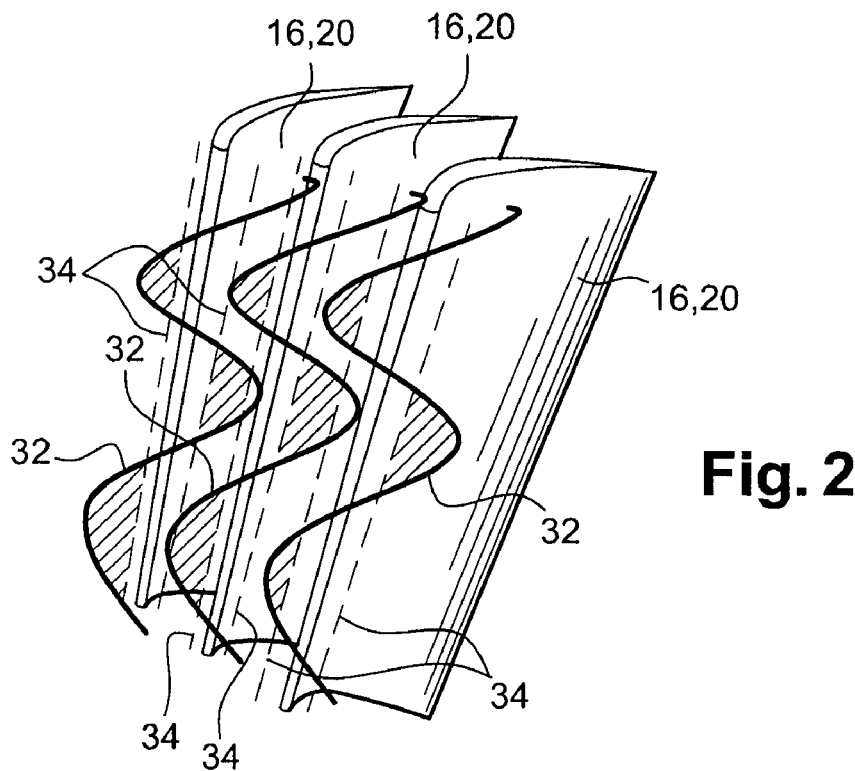
FIG. 2 is a diagrammatic perspective view of three airfoils of a stage of the FIG. 1 turbine, and it shows the profiles of the wakes at the leading edges of these airfoils.

The front portions of these wakes present a shape that is relatively complex and that varies as the wake advances along the flow section of the turbine. When the front of a wake reaches the leading edge of an airfoil 16, 20 it generally has a profile that undulates or is deformed as represented diagrammatically by curve 32 in FIG. 2. This curve 32 is obtained by the intersection of the streamlines of a wake with a plane perpendicular to the axis of the turbine substantially in register with the leading edges of the airfoils 16, 20.

In the prior art, multistage aerodynamic coupling is achieved by angularly positioning airfoils of a given type relative to one another in such a manner that the wakes represented by curve 32 are aligned as well as possible with the leading edges of the airfoils 16, 20. Nevertheless, under such circumstances, the multistage aerodynamic coupling is not optimal, in particular because a large fraction of the wakes (shaded portions in FIG. 2) is remote from the leading edges of the airfoils and therefore does not impact against said edges. Angular tolerances are generally defined for the position of a leading edge (as represented by dashed lines 34) for which it is considered that the wake formed directly upstream therefrom does indeed impact against the leading edge of the airfoil. These tolerances 34 can be expressed as a percentage of the pitch between two adjacent airfoils 16, 20 in the row under consideration. By way of example, this tolerance may be ±15% of the pitch between two adjacent airfoils. The shaded portions of the wakes lie outside these tolerances 34 and therefore do not contribute to the multistage aerodynamic coupling.

The invention enables this problem to be remedied by straightening the wakes from the trailing edges of the airfoils 16, 20 prior to angularly positioning the stator or rotor rows 12 or 14 relative to one another.

Figure 4:
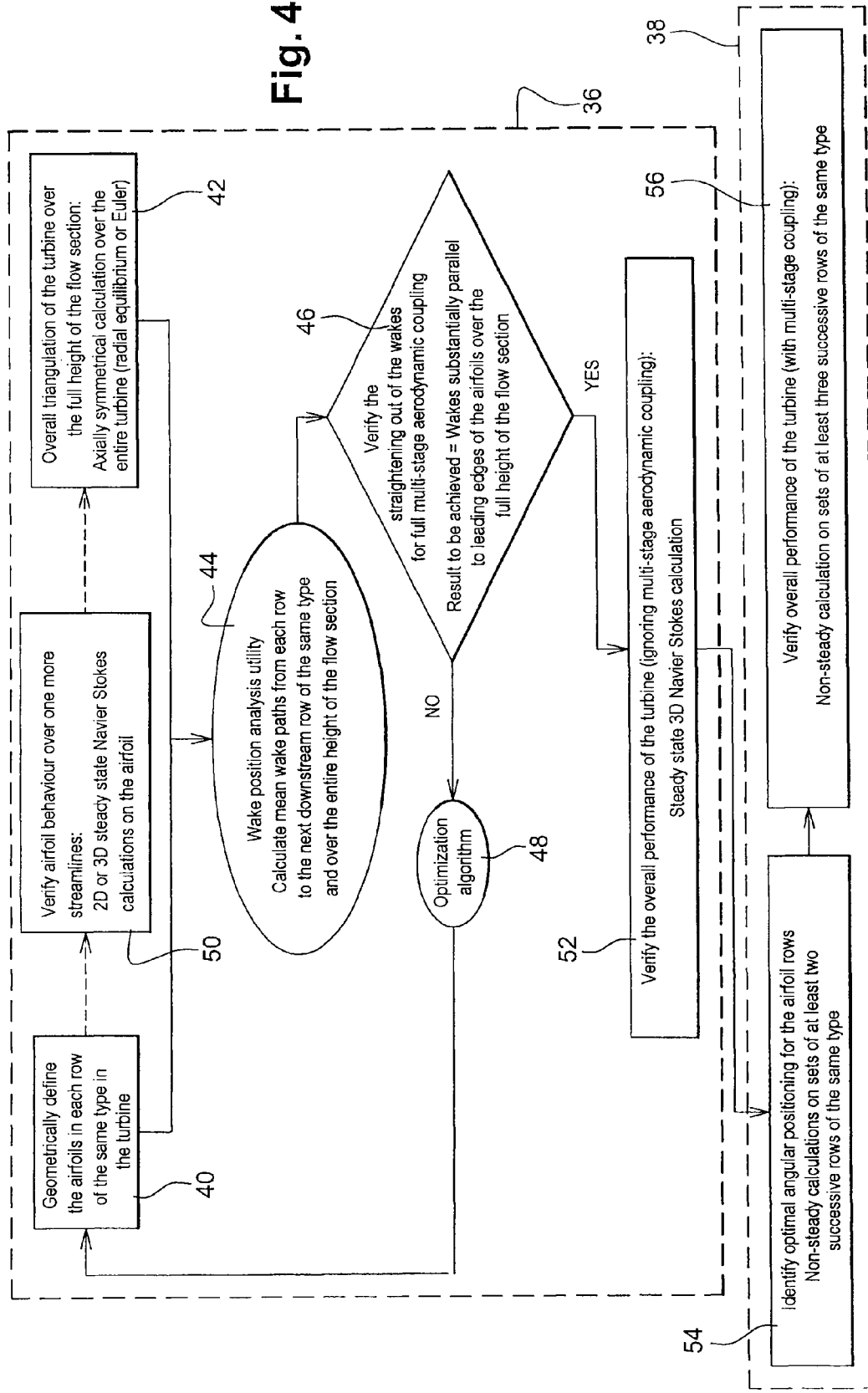
FIG. 4 is a flow chart showing the variant steps of the method of the invention.

FIG. 4 is a flow chart showing a non-limiting implementation of the method of the invention.

This method comprises two essential phases 36 and 38 that are represented diagrammatically by dashed line rectangles and that consist, for the first phase 36, in modifying or optimizing simultaneously the shapes of the airfoils in all of the rows of a given type in the turbine, so as to straighten the wakes from the trailing edges of said airfoils over substantially their entire radial extent, and for the second phase, in angularly positioning the rows in question relative to one another so that the above-mentioned wakes impact within a certain amount of angular tolerance against the leading edges of the airfoils situated directly downstream.

Figure 3:
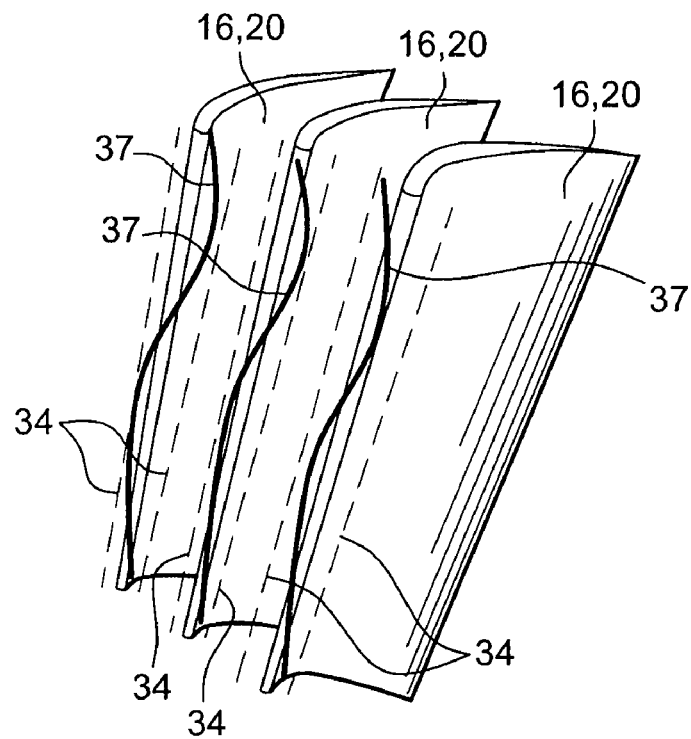
FIG. 3 is a view corresponding to FIG. 2 and shows the profiles of the wakes at the leading edges of the airfoils after performing a step of the method of the invention for straightening the wakes.

The purpose of the first phase 36 is thus to straighten out the wakes so that their fronts become substantially parallel to the leading edges of the airfoils situated downstream. In the example shown in FIG. 3, the straightening of the wakes can be seen as a flattening of the profiles of the fronts of the wakes, these profiles being represented diagrammatically by curve 37 that undulates only slightly.

The second phase 38 of angularly positioning the rows is made easier and consists in positioning these profiles within the predetermined angular positioning tolerances so as to ensure proper alignment between the wakes and the leading edges of the airfoils, so as to obtain multistage aerodynamic coupling that is optimized. There is no shaded portion in FIG. 3, which means that the wakes are caused to impact in full against the leading edges of the airfoils 16 and 20 by implementing the method of the invention.

More precisely, the first phase 36 of the method of the invention consists initially (step 40) in defining the shape of the airfoils in each row of the same type in the turbine. A turbine that has k stages has k rows of the same type and thus k rows of airfoils of this type of a shape that is to be optimized. The shape of the airfoils of a stage may differ from the shape of the airfoils of another stage and is defined by one or more parameters, e.g. selected from the spatial distribution of the airfoils, the curvature or camber of the airfoils, the angular positions of the leading and trailing edges of the airfoils, the inlet and outlet geometrical angles, the axial and azimuthal stacking, etc. This shape is determined over substantially the entire radial extent of the airfoil.

It is also possible to impose geometrical parameters that remain constant throughout the method. This applies for example to the distribution of the mean load on each row that is preferably kept constant in order to avoid having an unfavorable influence on the efficiency of the turbine, where efficiency is closely associated with this distribution of load per stage.

In practice, the multistage aerodynamic coupling is performed over a certain height of the flow section, e.g. corresponding to 80% of the height of the flow section, i.e. substantially 80% of the radial dimension of the airfoils. The remaining 20% corresponds to inner and outer peripheral portions (each respectively occupying 10%) of the flow section of the turbine in which the flow of gas is affected by secondary phenomena (high turbulence zones) and is complex. It is therefore difficult to achieve multistage aerodynamic coupling therein.

Thereafter, the method consists (step 42) in determining the flow profile of the gas around the airfoils in each row under consideration, over substantially the entire radial extent of the airfoils. This step 42 obtains overall triangulation for the turbine at a plurality of heights in the flow section and over substantially the entire radial extent of the airfoils. This step 42 also serves to determine the obstructions associated with the hindrance of the rows, the positions of the streamlines, and the mean speed of the fluid particles along these streamlines. Step 42 can be performed by axially symmetrical flow calculation over the entire turbine based on the principle of radial equilibrium or on Euler's theorem. This type of calculation is well known to the person skilled in the art and is described in the following publications:

L. H. Smith, Jr., Journal of Engineering for Power, January 1966, "The radial-equilibrium equation of turbomachinery"; and R. A. Novak, Transactions of the ASME, October 1967, "Streamline curvature computing procedures for fluid-flow problems".

The following step 44 consists in determining how the wakes formed by the airfoils in each row behave. This step 44 can be implemented using an appropriate utility program that analyzes variation in the positions of the wakes. This utility program makes it possible to calculate the mean path of fluid particles in wakes from each row all the way to the row of the same type situated downstream, and over the entire height of the flow section in the turbine or over substantially the entire height (e.g. 80% of said height in the above-described circumstances). In particular, this utility program makes use of the velocities of the fluid particles in the mean flow as calculated in step 42, and also of the shape of the airfoils, so as to be able to determine how the spatial positions of the fluid particles of the mean flow vary as a function of time throughout the turbine (ignoring the zones that are affected by the above-mentioned secondary phenomena).

Thereafter, in a step 46, it is verified whether the wakes have been straightened out sufficiently, i.e. whether the profiles of these wakes are substantially parallel to the leading edges of the airfoils situated downstream, and over substantially the entire radial extent thereof.

If the verification in step 46 is negative, then an additional step 48 is performed of modifying and optimizing the shape of the airfoils. This produces a new geometrical definition (step 40) for the airfoils in each row.

Thereafter, the aerodynamic behavior of the optimized airfoils is verified in following step 50 over one or more streamlines. This verification may be performed by steady flow calculations based on the two-dimensional or three-dimensional Navier-Stokes equations, which are well known to the person skilled in the art. This step 50 enables the geometrical modifications made to the airfoils to be validated quickly.

Thereafter, steps 42 and 44 are reiterated and verification is likewise performed during a step 46 to discover whether the desired result has been achieved or can still be improved.

The loop represented by the successive steps 40, 50, 42, 44, 46, and 48 can be performed one or more times, if necessary, until the result of step 46 is positive. This loop can be automated so as to be able to define in each step 48 the geometrical modifications that are to be made to the airfoils as a result of the step 46. This automation is made possible by using an optimization algorithm that serves to limit the number of repeats of this loop in order to obtain desired convergence on straightening out the wakes. Various optimization algorithms are described in the scientific literature. By way of example, the following reference describes one of them:

Milagros Vau Griken, "Optimisation pour l'apprentissage et apprentissage pour l'optimisation" [optimization for learning and learning for optimization], Université Paul Sabatier, Laboratoire MIP (UMR 5640), April 2005.

The above-mentioned steps are based on calculations that are relatively simple, so reiterating them is not expensive in terms of computation time, as contrasted to the design methods presently available in the art.

When the result of step 46 is positive, the overall performance of the turbine is verified, without taking account of the multistage aerodynamic coupling (step 52). For this purpose, it is possible to use at least one steady flow calculation based on the Navier-Stokes equations in three dimensions. The first phase of the method of the invention has then terminated. This first phase serves solely to describe in full the space-time path followed by fluid particles contained in the wakes. This phase gives access essentially to mean flow data, which data is sufficient for straightening out the wakes over substantially the entire height of the flow section.

The second stage 38 consists in particular of defining the exact space-time paths of the fluid particles in the wakes, and then in angularly positioning rows of the same type relative to one another in such a manner as to achieve the multistage aerodynamic coupling over all of the rows of the same type in the turbine.

The second phase 38 can be implemented on two or more successive rows of the same type in the turbine, and they may optionally be performed over the entire turbine.

It consists initially in identifying the optimum angular position for the row of the second stage relative to the row of the first stage upstream therefrom, and in particular relative to the wakes formed by the airfoils of the row of said upstream stage. This can be done using at least one unsteady flow calculation on the pair of rows under consideration, as is likewise well known to the person skilled in the art. Several unsteady calculation methods are available. One of them is described in the publications referenced below:

G. A. Gerolymos and V. C. Chapin, "Generalized expression of chorochronic periodicity in turbomachinery blade-row interaction", Rech. Aerosp., Vol. 1991_5, No. 5, 1991, pp. 69-73; and G. A. Gerolymos, G. J. Michon, and J. Neubauer, "Analysis and application of chorochronic periodicity in turbomachinery rotor/stator interaction computations", J. Prop. Power, Vol. 18, 2002, pp. 1139-1152.

Once this identification has been performed, the second row is set angularly relative to the row upstream, and the same step 54 is then performed for the rows of stages 3, 4, . . . , k situated downstream.

Once the multistage aerodynamic coupling has been performed for the rows of a given type in the turbine, the method can be repeated to perform coupling on the rows of the other type in the turbine.

In a variant, angular setting alternates between angular setting of two rows of one type and angular setting of two rows of the other type, going from upstream to downstream.

Finally, the overall performance of the turbine is verified (step 56) this time taking into consideration the multistage aerodynamic coupling. For this purpose, it is possible to use at least one unsteady flow calculation on at least two successive rows of the same type, and possibly over the turbine as a whole. This final step serves to validate the second phase 38 of the method.

What is claimed is:

1. A method of designing a multistage turbine for a turbomachine, each stage of the turbine comprising a stator row and a rotor row, each formed by an annular row of airfoils, each stator (or rotor, respectively) row having the same number of airfoils or a number that is a multiple of the number of airfoils of a row of the same type situated upstream, wherein the method consists, for all of the stator or rotor rows:

a) modifying simultaneously the shape of the airfoils of the various rows to straighten out the wakes from the trailing edges of said airfoils over substantially the entire radial extent of the airfoils; and then b) angularly positioning the rows relative to one another in such a manner that the wakes from the stator (or rotor, respectively) rows of a stage n impact within a certain angular tolerance on the leading edges of the stator (or rotor, respectively) rows of a downstream stage n+1, so as to achieve multistage aerodynamic coupling simultaneously over the turbine as a whole.

2. A method according to claim 1, wherein, in step a), it consists:
1) defining the shapes of the airfoils of the various rows over substantially the entire radial extent of the airfoils;
2) determining the mean flow of gas around the airfoils of the various rows over substantially the entire radial extent of the airfoils;
3) determining how the wakes from the airfoils of the various rows vary; and
4) verifying that the wakes from the stator (or rotor, respectively) airfoils of a stage n̄ are substantially parallel, within a given angular tolerance, to the leading edges of the stator (or rotor, respectively) airfoils of a respective downstream n+1.

3. A method according to claim 2, wherein, when the result of the verification in step 4) is negative, the method further consists:
5) modifying the shapes of the airfoils of the various rows over the entire radial extent of the airfoils;
6) verifying the aerodynamic behavior of the modified airfoils; and
7) repeating steps 2), 3), and 4).

4. A method according to claim 3, wherein the modifications to the shapes of the airfoils in step 5) are determined by an optimization algorithm.

5. A method according to claim 4, wherein steps 5), 6), and 7) are repeated one or more times until the result of the verification in step 7) is positive.

6. A method according to claim 4, wherein the shapes of the airfoils of the various rows are modified by varying one or more parameters selected from: the spatial distribution of the airfoils; the curvature of the airfoils; and the angular positions of the leading and trailing edges of the airfoils.

7. A method according to claim 4, wherein, during the modification of the shapes of the airfoils of a row, the method consists in conserving the mean load distribution of the row.

8. A method according to claim 3, wherein, after step 4) or 7), the method consists in verifying the aerodynamic behavior of the turbine by analyzing gas variation within the turbine.

9. A method according to claim 1, wherein, in step b), it consists:
i) identifying the optimum angular position for the stator (or rotor, respectively) row of each stage n+1 relative to the stator (or rotor, respectively) row of the upstream stage n and relative to the wakes of the airfoils of the row of said stage n; and
ii) angularly positioning the rows relative to one another from upstream to downstream in such a manner that the wakes formed by the airfoils of the stator (or rotor, respectively) row of a stage n impact within a certain angular tolerance against the leading edges of the stator (or rotor, respectively) airfoils of a downstream stage n+1.

10. A method of fabricating a multistage turbine for a turbomachine, wherein the method consists in designing a turbine by the method of claim 1, and then in making the turbine.

11. A turbomachine including a turbine made by the method of claim 10.

* * * * *